United States Patent Office 3,320,035
Patented May 16, 1967

3,320,035
NITROGEN COMPOUND SYNTHESIS
Donald H. Kelly, Gladstone, and Bernard Sukornick, Elizabeth, N.J., assignors to Allied Chemical Corporation, New York, N.Y., a corporation of New York
No Drawing. Filed July 18, 1963, Ser. No. 296,885
3 Claims. (Cl. 23—356)

This invention relates to processes for making difluoramine, $HNF_2$, a known compound normally a colorless gas having a boiling point of about minus 23° C. Difluoramine is useful as a reactant, e.g. with boron trichloride or carbonyl chloride to form chlorodifluoramine, $F_2NCl$ which in turn is useful as a chemical intermediate such as for reaction of mercury by known methods to make tetrafluorohydrazine, $N_2F_4$, a commercially available material.

It has been found that sulfamide, water, and elemental fluorine may be reacted conveniently under certain easily controllable reaction conditions to form difluoramine in good yields. Overall reaction is thought to be represented by $$NH_2SO_2NH_2 + H_2O + 2F_2 \rightarrow HNF_2 + NH_2SO_3H$$

The invention processes may be carried out in a two-stage reaction operation which in general comprises providing, in a first or fluorination reaction stage, an aqueous solution of sulfamide, subjecting the sulfamide while in aqueous solution to the action of certain quantities of elemental fluorine at certain relatively low reaction temperatures to form a fluorinated intermediate product; and thereafter, in a second or heating stage, subjecting the fluorinated reaction production of the first stage to heating at higher temperature to effect fluorination of difluoramine; and recovering difluoramine from the resulting reaction mass.

Principal factors involved in overall reactions control are: in the first stage, proportioning of starting material reactants, i.e. sulfamide, water and fluorine, and temperatures needed to effect fluorination of sulfamide; and in the second stage, the temperatures required to accomplish the difluoramine forming reaction by conversion of the intermediate fluorinated sulfamide to $HNF_2$.

Stoichiometric ratios of incoming reactants charged to the first stage of the process are substantially as above indicated. However, for convenient practice, water is utilized in relatively large excess. Minimum desirable amount of water is that needed to make, with the particular quantity of sulfamide charged, a liquor which may be readily agitated. While proportions of sulfamide and water may be such that the aqueous liquor is not saturated with sulfamide, no advantage is afforded by use of water greater than the amount needed at the outset of a run to form a water solution substantially saturated with sulfamide, and such a solution is preferred.

The two stages of reaction may be carried out step-wise in the same reactor. Procedurally, in usual practice a solution, preferably consisting of the particular amount of sulfamide to be processed and water in amount to form a water solution saturated with sulfamide, is introduced into a suitable reactor, made of e.g. Monel, Teflon, and Pyrex, and having an inlet for gaseous fluorine, an off-gas outlet, and suitable accessories arranged to provide for maintenance of the reactor and contents at herein indicated temperatures. A product recovery system may include a drying tower for removal of moisture from the reactor off-gas, and a cold trap equipped with refrigerating facilities which may be regulated to condense difluoramine and recover the same as liquid in the cold trap. In general, apparatus suitable for practice of a preferred embodiment of the invention may be of the type indicated in appended Example 1.

The quantity of fluorine fed into the reactor for reaction with sulfamic acid and water may be in any proportion which effects substantial reaction with sulfamic acid and water to form substantial amounts of difluoramine. As little as 1.0–1.5 mols of fluorine per mol of sulfamic acid charged may be used. In order to avoid formation of appreciable amounts of nitrogen trifluoride as by-product, not more than about 4 mols of fluorine should be employed. To minimize $NF_3$ formation and enhance yields it is preferred to charge about 2–4 mols of fluorine per mol of sulfamide. Also, to further reduce likelihood, of $NF_3$ formation, fluorine as fed should be diluted with at least four volumes of inert gas such as nitrogen and helium, preferably with not less than five volumes, and generally in the range of 5–15 volumes per volume of fluorine. On introduction of gaseous fluorine into the reactor, although reaction is rapid it is preferred to introduce fluorine at a rate such that fluorine is substantially consumed as fed, a condition readily determinable by the absence of fluorine in the recovery system off-gas.

In accordance with the invention it has been found that when a previously described charge of an aqeous solution of sulfamide is subjected to the action of elemental fluorine at temperature substantially in the range of zero or a little below to about plus 5° C., there is formed a fluorinated intermediate product which after completion of fluorination and when heated to appreciably higher temperature further reacts to effect formation of difluoramine which is evolved as gas. Since during reaction at temperatures substantially in the range of zero–5° C., the off-gases of the reaction contain only nitrogen or other inert diluent gas plus relatively trace amounts of $N_2O$, $SiF_4$ $NF_3$, and $CF_4$, and since if fluorination is carried out at higher temperatures, much above about 5° C. e.g. 10° C., the off-gases of the reaction contain only nitrogen trifluoride and nitrous oxide, it is thought that reactions effected in the invention processes are step-wise and may be represented by (1)   $NH_2SO_2NH_2 + 2F_2 \xrightarrow{H_2O} NF_2SO_2NH_2 + HF$ and (2)   $NF_2SO_2NH_2 + H_2O \rightarrow HNF_2 + NH_2SO_3H$ indicating that the fluorinated product is N,N-difluorosulfamide. Hence, overall operations appear to include two relatively clearly defined reactions in the first of which fluorine and sulfamide react in the presence of water to form the fluorinated intermediate without formation of any $HNF_2$, and the second a heating step in which the fluorinated intermediate reacts with water to form $HNF_2$ and sulfamic acid.

At temperature substantially in the range of zero–5° C. fluorination is rapid and practically instantaneous. Temperatures of reactor and contents may be readily maintained by immersion of the reactor in an ice bath. Reaction, effected while agitating, is smooth and end point of reaction of fluorine with a given amount of sulfamide may be readily determined by the presence of fluorine in the exit of the cold trap of the recovery system. On completion of first stage reaction the mass in the reactor is a water-white solution.

It has been found that on termination of fluorination, i.e. cessation of fluorine feed, when temperature of the mass in the reactor is raised appreciably above 5° C., gaseous $HNF_2$ begins to evolve to some extent. Preferably temperatures are raised to above 15° C., and more usually to about room temperature or 20–30° C., at which temperatures gaseous $HNF_2$ is rapidly evolved from the mass in the reactor. To hasten evolution of HNF$_2$ in the reactor, the latter and the contents thereof may be heated to temperatures well above room temperature but not to temperatures appreciably above 80–85° C., since high temperatures afford no advantage and tend to increase water and sulfamic acid carry-off from the reactor along with HNF$_2$ gas.

Recovery of sought-for HNF$_2$ product from the reactor exit gas may be substantially conventional. The reactor exit gas may be passed thru a suitable drying tower to remove water and any sulfamic acid mist. The dried gas stream may then be passed thru a cold trap refrigerated to say minus 80° C. or below by Dry-Ice or other suitable refrigerant to condense out and collect HNF$_2$ as a colorless liquid. As demonstrated in the appended examples, the off-gas of the cold trap may contain nitrogen or other inert gas diluent and trace amounts of N$_2$O, SiF$_4$, NF$_3$ and CF$_4$, but no difluoramine. On completion of a run, HNF$_2$ may be recovered from the cold trap by conventional distillation, experience showing that the difluoramine thus obtained is substantially pure.

The following illustrate practice of the invention.

*Example 1*

About 10 g. (0.1 mol) of sulfamide were dissolved in about 100 ml. of water at room temperature in a 3-necked glass flask fitted with a gas inlet, an agitator, and a gas outlet connected in series thru a tower containing Drierite, a Dry-Ice condenser equipped with a calibrated glass trap, and an infrared cell. Reactor and contents were cooled to about zero-plus 5° C. by an ice bath. The system was flushed for about 30 min. by introduction of nitrogen charged at a rate of about 200 cc. per minute. After flushing, and while the solution was being agitated, for a period of about 4 hours, during which time the reactor and contents were maintained at temperature of about 0–5° C., a mixture consisting of nitrogen and elemental fluorine was fed into the reactor at a rate of about 200 cc. of nitrogen and about 40 cc. of fluorine per minute (fluorine flow about 0.1 mol/hr.). Rate of introduction of the mixture into the agitated solution was such that fluorine was consumed substantially as fed. Off-gases of the reactor were passed successively thru the drying tower, the Dry-Ice trap, and then thru the infrared cell. In the 4 hour period, about 0.4 mol of fluorine was fed, and mol ratio of total reactants charged was about 4 mols of fluorine per mol of NH$_2$SO$_2$NH$_2$. During low temperature fluorination, no HNF$_2$ or anything else was collected in the Dry-Ice trap, and aside from nitrogen, as shown by infrared analysis, off-gases of the Dry-Ice trap contained trace amounts of N$_2$O, SiF$_4$, NF$_3$ and CF$_4$, but no HNF$_2$. On termination of fluorine feed, and while maintaining the reactor and contents at temperature of about 0°–5° C., the solution and system were flushed with nitrogen for about 30 minutes. The ice bath was removed from around the reactor. The reactor and contents were allowed to warm up to about room temperature during a period of about 2 hours and while passing a slow stream of nitrogen thru the drying tower, the Dry-Ice trap, and the infrared cell. During the warming up period, aside from nitrogen, as shown by infrared analysis, off-gases of the Dry-Ice trap contained trace amounts of N$_2$O, SiF$_4$, NF$_3$, and CF$_4$, but no HNF$_2$. Particularly when the reactor and contents were above about 10° C. and approached room temperature, HNF$_2$ began to collect in the trap. At the end of the warming up period and when the contents of the reactor were about room temperature, about 1.2 ml. of water-white liquid had been condensed and collected in the minus 80° C. trap. The latter was removed from the Dry-Ice bath and allowed to warm up. The liquid in the trap was evaporated into a nitrogen stream to carry the same into infrared analysis equipment. Aside from nitrogen, infrared analysis showed that the off-gas from the warmed up trap contained only difluoramine, HNF$_2$. On the basis of the amount of liquid collected in the minus 80° C. trap and the amount of sulfamide charged, yield of difluoramine was about 16–17% of theory.

*Example 2*

About 10 g. (0.1 mol.) of sulfamide were dissolved in about 150 ml. of water at room temperature in the reactor of Example 1. Reactor and contents were cooled to about zero-plus 5° C. by an ice bath. The reactor was flushed for about 30 min. by a nitrogen stream charged at a rate of about 200 cc. per minute. After flushing and while the solution was being agitated, for a period of about 4 hrs., during which time the reactor and contents were maintained at temperature of about zero–5° C., a mixture consisting of nitrogen and elemental fluorine was introduced into the reactor at a rate of about 200 cc. of nitrogen and about 40 cc. of fluorine per minute. Rate of introduction of the mixture into the agitated solution was such that fluorine was consumed substantially as fed. In the four hour period about 0.4 mol of fluorine was fed, and mol ratio of total reactants charged was about 4 mols of fluorine per mol of NH$_2$SO$_2$NH$_2$. During fluorination the off-gas from the reactor, besides nitrogen, were shown by infrared analysis to contain trace amounts of N$_2$O, SiF$_4$, NF$_3$, and CF$_4$. On termination of fluorine feed and while maintaining in the reactor and contents at temperature of about zero–5° C., the contents of the reactor were flushed with nitrogen for about 30 minutes. The gas outlet of the reactor was then connected in series thru a tower containing Drierite, a low temperature condenser equipped with a calibrated glass trap and refrigerated to about minus 120° C., by means of a CCl$_3$F-liquid nitrogen slush, and an infrared cell. The ice bath was removed from around the reactor. The system was flushed with a slow stream of nitrogen introduced at a rate of about 50 cc. per minute. The reactor was placed in a heating mantle, and during a period of about 2 hours the reactor and contents were heated gradually to a temperature of about 80° C. Off-gases of the reactor were passed thru the drying tower to condense out water, thru the refrigerated condenser and thru the infrared cell. During the warming up period, particularly when the reactor and contents were above about 10° C. and approached room temperature, HNF$_2$ began to collect in the trap. Apart from nitrogen, as shown by infrared analysis, off-gases of the trap contained trace amounts of N$_2$O, SiF$_4$, NF$_3$ and CF$_4$, but no HNF$_2$. At the end of the two hour heating period, when contents of the reactor reached about 80° C., about 3.5 ml. of water-white liquid had been condensed and collected in the trap. The latter was removed from the refrigerating slush and allowed to warm up. The liquid in the trap was evaporated into the nitrogen stream to carry the same into the infrared analysis equipment. Aside from nitrogen, infrared analysis showed that off-gases from the warmed up trap contained only difluoramine, HNF$_2$. On the basis of the amount of liquid collected in the refrigerated trap and the amount of sulfamide charged, yield of difluoramine was about 48% of theory.

We claim:

1. The process for making difluoramine which comprises forming an aqueous solution of sulfamide, introducing into said solution gaseous elemental fluorine, in amount not substantially in excess of four mol proportions of fluorine per mol of NH$_2$SO$_2$NH$_2$, while maintaining temperature of said solution substantially in the range of zero–5° C., and thereafter heating the reaction mass to higher temperature but not substantially above 85° C. to effect evolution of gaseous difluoramine from the reaction mass.

2. The process for making difluoramine which comprises forming an aqueous solution of sulfamide, introducing into said solution gaseous elemental fluorine, in amount substantially in the range of 2–4 mol proportions of fluorine per mol of $NH_2SO_2NH_2$, while maintaining temperature of said solution substantially in the range of zero–5° C., thereafter heating the reaction mass to temperature substantially in the range of 15–85° C. to effect evolution of gaseous difluoramine from the reaction mass, and recovering difluoramine thus evolved.

3. The process of claim 2 in which the fluorine is charged as an inert gas-fluorine mixture containing not less than four volumes of inert gas per volume of fluorine.

References Cited by the Examiner

Audrieth et al.: "Chemical Reviews," vol. 26, pp. 78, 79 (1940).

Grakauskas: American Chemical Society, Abstracts of Papers, 140th Meeting, 1961, pp. 23M, 24M.

OSCAR R. VERTIZ, *Primary Examiner.*

C. D. QUARFORTH, M. WEISSMAN,
*Assistant Examiners.*